(No Model.) 2 Sheets—Sheet 1.

E. G. MINNEMEYER.
STRAINER FOR CONDUCTORS.

No. 536,038. Patented Mar. 19, 1895.

Witnesses:—
W. H. Edwards
W. K. Stevens

Inventor
Edward G. Minnemeyer
By H. H. Bliss
Atty.

(No Model.) 2 Sheets—Sheet 2.

E. G. MINNEMEYER.
STRAINER FOR CONDUCTORS.

No. 536,038. Patented Mar. 19, 1895.

Witnesses
W. H. Edwards.
W. R. Stevens.

Inventor
Edward G. Minnemeyer
By H. H. Bliss
Atty.

UNITED STATES PATENT OFFICE.

EDWARD G. MINNEMEYER, OF CHICAGO, ILLINOIS.

STRAINER FOR CONDUCTORS.

SPECIFICATION forming part of Letters Patent No. 536,038, dated March 19, 1895.

Application filed December 13, 1894. Serial No. 531,664. (No model.)

*To all whom it may concern:*

Be it known that I, EDWARD G. MINNE-MEYER, a citizen of the United States, residing at Chicago, in the county of Cook and State of Illinois, have invented certain new and useful Improvements in Strainers for Conductors; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 2:
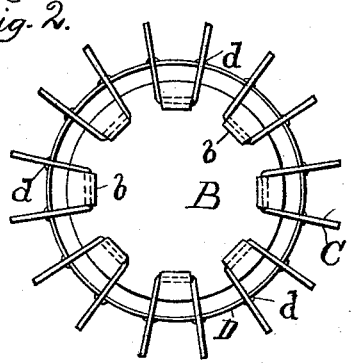
Figure 1:
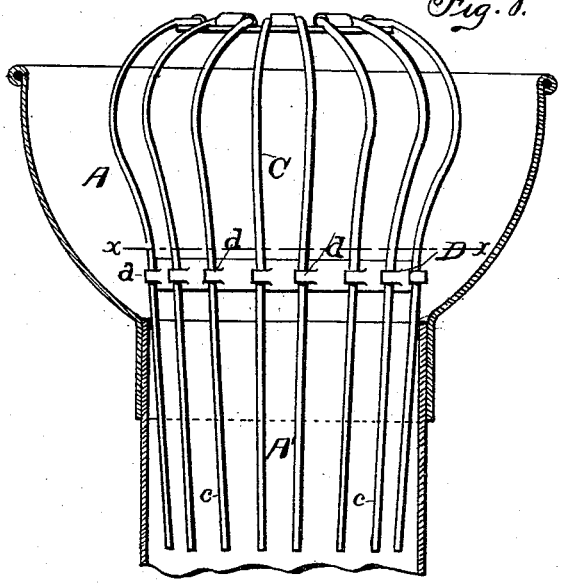
Figure 4:
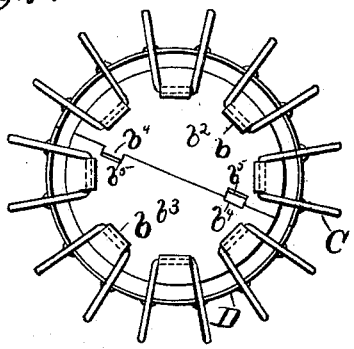
Figure 3:
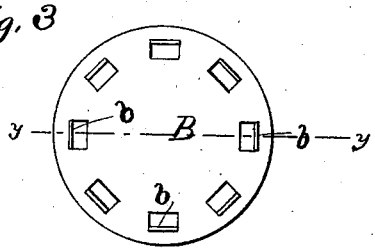
Figure 5:
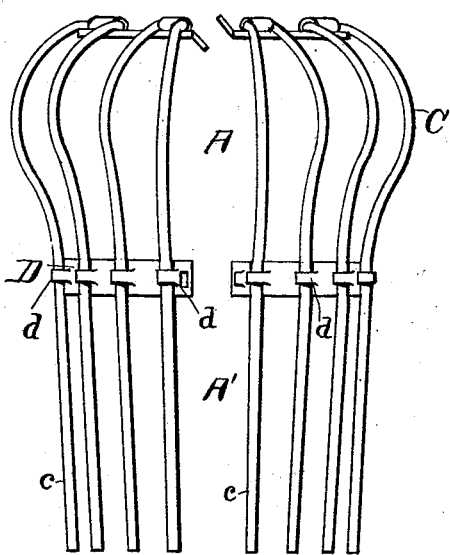
Figure 6:
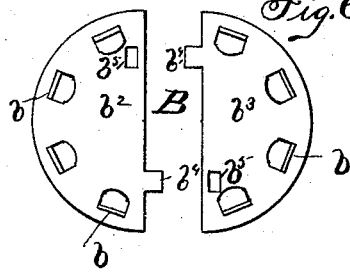
Figure 8:
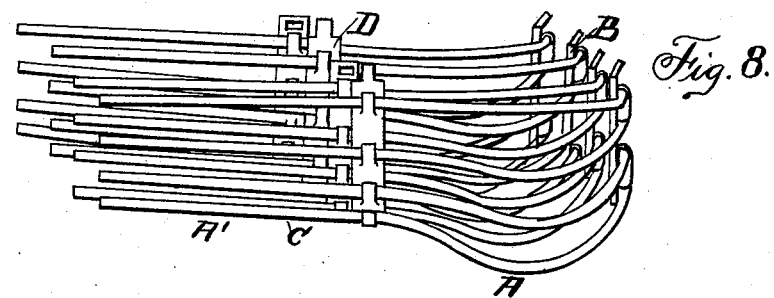
Figure 7:
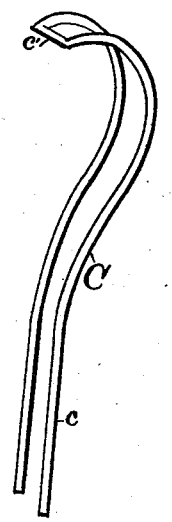
Figure 9:
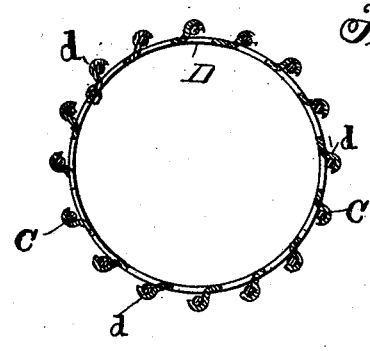
Figure 10:
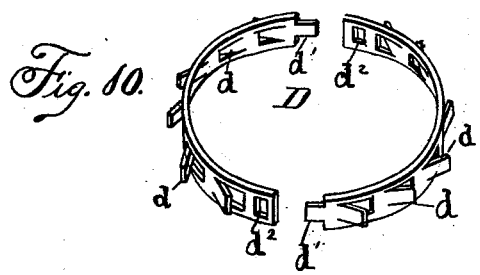
Figure 11:
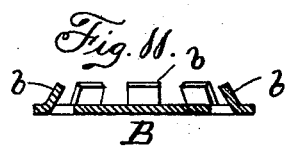

Figure 1 is a side view of a device embodying my improvements. Fig. 2 is a top plan view thereof. Fig. 3 is a plan view of the top plate, detached. Fig. 4 is a plan view of the top plate of the device when made in sections. Fig. 5 is a side view, showing the sections separated. Fig. 6 shows the two parts of the top plate. Fig. 7 is a perspective view of one of the wires detached. Fig. 8 shows the sections packed or nested together. Fig. 9 is a sectional view on the line $x\ x$ of Fig. 1. Fig. 10 is a detail of the body ring used in the form shown in Figs. 4 and 5. Fig. 11 is a sectional view on the line $y\ y$ of Fig. 3.

In the drawings the strainer is indicated as being formed with two main parts, A and A', the former being somewhat ball shaped and the latter being conical or approximately cylindrical. Heretofore these articles have been made of wires woven or otherwise secured in such way as to have them shaped substantially as described; but the process of weaving has made them expensive, and they have been of such form that a large amount of room was necessary in packing them or storing them in the packages used in shipment.

One of the objects of the present invention is to provide an article and a method of manufacturing such that it can be produced at an exceedingly low cost, and shall have parts so related that they can be compactly "nested" for shipment. The ball part A has at the top a plate B. Preferably, this is a circular plate of sheet metal such as tin. At the time it is cut from the sheet or strip it is also cut and stamped so as to provide a series of tongues or lips $b$ projecting in one direction or another, as desired. I prefer to cut these tongues of substantially the shape shown, that is to say so that they are oblong and have their free edges extending toward the center, but they may be varied in this respect. Simultaneously with the cutting of these tongues from the body of the plate they are bent slightly as shown in Figs. 3 and 11.

C indicates the wires. Each is initially bent so as to provide the legs $c$ with a connecting part $c'$. After the top plate B has been cut and shaped, and while it is suitably held, as in a clamp, the wires C are attached by placing the part $c'$ of each under one of the tongues $b$, after which the tongue is bent down and fastened in such way as to prevent the escape of the wire.

When the strainer is to be made in halves the top plate B is cut as shown in Fig. 4; that is to say, in two halves $b^2$ and $b^3$, each being cut with a tongue $b^4$ and with an aperture $b^5$. In such case the wires may be secured to the halves separately, or the latter may be first temporarily joined and the wires of the entire series secured. The fastening of the wires can be effected either by hand or by a steam press. In any case a power press should be applied, even though the tongues are preliminarily bent by a hammer or the like. After the wires have been secured to the top plate their ends are brought comparatively close together, as shown in Fig. 1. The wires can be shaped in a former prior to securing them to the plate B, so that they will have the conformation shown in Fig. 7, or they can remain straight until after they are clamped to the plate and can then be bent down over a former so as to assume the desired shape. The straight lower ends of the wires are secured to the ring D. It is also formed with tongues or lips $d$ under which the wires can be placed, and secured by bending or pressing.

When the article is to be made in halves the ring is formed in two parts, each having a tongue at one end and an aperture at the other, as shown at $d'$, $d^2$.

In Figs. 4, 5 and 6 I have illustrated the article when made in sections. In Fig. 8 they are shown in the position occupied when they are packed or nested together. When made in the way so shown, they can be readily stored in small compass so that large quantities can be shipped without increasing bulk. After the parts have been secured together and properly shaped, they are submitted to the action of the galvanizing bath which finishes them and finally secures them rigidly together.

I herein refer to the part at D as a ring, but it will be understood that so far as concerns the use of a top plate as at B for the upper parts of the wires this ring may be modified both as to material and other features without departing from the invention.

What I claim is—

1. The herein described strainer, it having the top sheet metal plate, B, the wires C secured thereto, and the ring D secured to the wires, substantially as set forth.

2. The herein described strainer formed in two separable halves, each having a sheet metal plate at the top, and a half ring at the bottom, said plates and ring sections being detachably secured together, substantially as set forth.

3. The herein described strainer having the top sheet metal plate formed in sections, said sections having tongues and apertures for detachably fastening them together, and cut to form the tongues $b$, the wires C each bent to provide two downward extending legs $c$, secured by the said tongues, and means at the lower ends of the wires for holding them together, in two separable sets, substantially as set forth.

In testimony whereof I affix my signature in presence of two witnesses.

EDWARD G. MINNEMEYER.

Witnesses:
OSCAR L. MCMURRY,
ELLA C. HOWE.